(12) United States Patent
Lin

(10) Patent No.: US 6,844,850 B1
(45) Date of Patent: Jan. 18, 2005

(54) ANTI-JAMMER PRE-PROCESSOR

(75) Inventor: Tsui-Tsai Lin, Zhubei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/850,236

(22) Filed: May 20, 2004

(51) Int. Cl.[7] ................................................ G01S 3/16
(52) U.S. Cl. ........................ 342/378; 342/16; 455/63.1; 455/114.2
(58) Field of Search ...................... 342/16, 19, 357.06, 342/357.12, 378, 383; 701/213, 215; 702/189, 191; 455/63.1, 63.4, 114.2; 370/286, 335, 342

(56) References Cited

U.S. PATENT DOCUMENTS

| | | | |
|---|---|---|---|
| 4,672,378 A | * | 6/1987 | Drabowitch et al. .......... 342/17 |
| 6,486,828 B1 | * | 11/2002 | Cahn et al. ................ 342/363 |
| 6,598,014 B1 | * | 7/2003 | Rabideau et al. ........... 702/194 |
| 6,687,492 B1 | * | 2/2004 | Sugar et al. ............. 455/276.1 |
| 2002/0051433 A1 | * | 5/2002 | Affes et al. ................. 370/335 |
| 2004/0028013 A1 | * | 2/2004 | Fitton et al. ................ 370/335 |

* cited by examiner

*Primary Examiner*—Dao Phan
(74) *Attorney, Agent, or Firm*—Thomas, Kayden, Horstemeyer & Risley

(57) ABSTRACT

A blind anti-jammer pre-processor for detecting and alleviating the performance degradation due to strong jammers is disclosed. The anti-jammer pre-processor comprises a jammer detector (10) determining strong jammers based on the eigen-value spread associated with the received data correlation matrix, and an optimal combiner (12) producing nulls for suppressing the detected strong jammers and a mainbeam for receiving Signals-of-interest (SOI). The present invention also discloses a GPS receiver comprising the anti-jammer pre-processor (32), a correlator (34), a phase compensator (36), and a hard decision detector (38). The outputs of the anti-jammer pre-processor (32) are sent to the correlator (34) to restore the bit stream. The predetermined 8-bit preambles in the first word associated with each subframe of GPS data are used to estimate the phase rotation introduced by the optimal combiner performed on the SOI.

18 Claims, 3 Drawing Sheets

ANTI-JAMMER PRE-PROCESSOR

BACKGROUND OF THE INVENTION

1. Field of the Invention

The present invention relates to an anti-jammer pre-processor used in a wireless communication receiver, and more specifically, to a blind anti-jammer pre-processor for a Global Positioning System receiver.

2. Description of the Related Art

Global positioning system (GPS) employs satellite-based location techniques to provide precision navigational capabilities for aircraft, ships, and ground traffic. GPS receivers are effective in extracting the navigational information signals transmitted from satellites due to a large processing gain with spread spectrum techniques. Nevertheless, performance will significantly degrade if any strong interference source coexists with the information signal. The interfering signal is frequently referred as a jammer. Typically, a jamming power level less than 40 dB with respect to the signal power level, i.e. jammer-to-signal ratio (JSR) of 40 dB, can be tolerated. In practice, this is impossible since the existence of strong unintentional radio frequency interference and intentional jammers are easily generated due to weakness of the received GPS satellite signal of about −160 dBm on the ground, will disable the receiver. Consequently, a technique for powerful jammer suppression has gained much attention.

A beamformer is a linear combiner which transforms the array data vector x into a scalar output y via an M×1 complex weight vector w, where M denotes the number of antennas:

$$y = w^H x \quad \text{Equation (1)}$$

The design of a beamformer for the above scenario involves minimizing the output power subject to a unit response constraint in the composite steering vector associated with the Signal-of-Interest (SOI) $a_d$. Specifically, it determines the optimum weight vector w by solving the following optimization problem:

$$\min_w E\{|y|^2\} \equiv w^H R w \quad \text{Equation (2)}$$
$$\text{subject to: } w^H a_d = 1$$

Where R is the M×M data correlation matrix defined by $$R = E\{xx^H\} = \sigma_d^2 a_d a_d^H + A_M S_M A_M^H + \sigma_n^2 I$$
$$\approx A_M S_M A_M^H + \sigma_n^2 I \quad \text{Equation (3)}$$

where the K×K matrix $S_M = E\{s_M s_M^H\}$ denotes the source correlation matrix involving the interferers. The noise correlation matrix is given by $\sigma_n^2 I$ due to the spatial whiteness assumption. Note that the approximation in Equation (3) follows from the fact that the desired signal is well below the powers of interferers, i.e., $\sigma_n^2 \ll \sigma_i^2$, where $\sigma_i^2$ denote the powers of interferers. In practice, the data correlation matrix in Equation (3) is replaced with the time-averaging operator given by:

$$\hat{R} = \frac{1}{N} \sum_{n=1}^{N} x[n] x^H[n] \quad \text{Equation (4)}$$

where x[n] denotes the nth sample of the received data and N is the number of samples.

The Linear Constrained Minimum Variance (LCMV) problem in Equation (2) has the solution:

$$w = R^{-1} a_d \quad \text{Equation (5)}$$

Note that the constant gain in w has been omitted since it does not affect the output SINR performance. A major problem of the direct implementation of the LCMV beamforming is that the composite steering vector $a_d$ is not practically possibly.

Another widely used approach is to obtain the signal weights to produce the Minimum Mean Square Error (MMSE) between the desired temporal signal sequence $S_d$ and the output of beamformer y. That is, the weights are constructed according to minimizing Equation (6), $$\varepsilon = E\{|S_d - y|^2\} = E\{|S_d - w^H x|^2\} \quad \text{Equation (6)}$$
$$= E\{S_d S_d^*\} - w^H E\{x s_d^*\} - x^H E\{w s_d\} + w^H E\{x^* x^T\} w$$

which yields the solution given by:

$$w = R^{-1} d_s \quad \text{Equation (7)}$$

where $d_s = E\{x^* S_d\}$.

SUMMARY OF THE INVENTION

Accordingly, the object of the present invention is to provide a jammer detector to determine the existence of strong jammers.

Another object of the present invention is to alleviate the performance degradation of a receiver in the presence of strong interfering signals (jammers).

An embodiment of the invention discloses a blind anti-jammer pre-processor for alleviating performance degradation due to strong jammers, which comprises a jammer detector. The jammer detector computes a data correlation matrix R associated with received data and determines whether strong jammers exist in the received data according to an eigen-value spread of the data correlation matrix. The anti-jammer pre-processor further comprises an optimal combiner which constructs a weight vector based on transformed data Tx if strong jammers are detected by the jammer detector, and otherwise constructs the weight vector based on the received data x. The weight vector is used to control a beam pattern for collecting the signal of interest (SOI).

The data correlation matrix R associated with the received data is approximated by a time-averaging operator as shown in Equation (4).

The eigen-value spread of the data correlation matrix R is determined by computing a ratio between an averaged trace and a root of determinate of the data correlation matrix R, $$\frac{M\sqrt[M]{\det(R)}}{tr(R)},$$

wherein M denotes the number of eigen-values. The trace is computed by summing diagonal elements of the data correlation matrix R. The jammer detector determines that strong jammers exist in the received data if this ratio is greater than a preset value, for example, 10.

The transformation T for deriving the transformed data Tx is a complementary projection matrix associated with a jammer orthonormal matrix $U_j$ $(T=I-U_jU_j^H)$.

Another embodiment of the present invention discloses a GPS receiver comprising M antennas, an anti-jammer pre-processor, a correlator, and a phase compensator. The anti-jammer pre-processor of the present embodiment may be identical to the one previously described. The antennas receive GPS signals from satellites and output weighted and summed data according to a weight vector. The anti-jammer pre-processor detects and suppresses strong jammers in the received data by constructing the weight vector that blocks the reception of directions with the strong jammers. The correlator despreads the output of the anti-jammer pre-processor to extract the transmitted data. Finally, the phase compensator detects and offsets the phase rotation introduced in the anti-jammer pre-processor. The GPS receiver of the present invention can further comprise a hard decision detector coupled to the phase compensator for recovery of the GPS data bits.

The phase compensator detects the phase rotation introduced by the anti-jammer pre-processor based on predetermined preambles in the first word associated with each subframe of GPS data. The phase compensator comprises a preamble extractor, a phase aligning multiplier, and an accumulator. The preamble extractor locates and passes preambles to the phase aligning multiplier for compensating the phases among the preamble bits by multiplying the despread data with the predetermined preambles. The accumulator then sums up the successive processed preambles.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

In a wireless communication system, the array processing technique is widely used to alleviate the fading effect. To achieve reliable communication quality, the antenna outputs are weighted and summed to receive the signal-of-interest (SOI) as much as possible during the presence of interference. In Direct Sequence Spread Spectrum (DSSS) systems, the optimal weights associated with the maximum signal-to-interference-plus-noise ratio (MSNR) beamformer are constructed by directly utilizing the input and output signals of correlators. Mathematically speaking, the optimal weights can be obtained by:

$$Rw = \lambda \tilde{R}w \qquad \text{Equation (8)}$$

where $\tilde{R}$ denotes the data correlation matrix associated with the despread data. The solution to the eigen-equation in Equation (7) is given by the eigenvector associated with the maximum eigen-value. The MSNR beamformer has been shown to be effective in dealing with strong jammers as the path delays are correctly pre-determined. In the presence of strong interference, however, the delays of SOI paths are hard to correctly estimate, so that the correlators cannot successfully extract the SOI. This will result in the desired signal cancellation in the MSNR criterion. As a remedy, the strong jammers have to be suppressed before the correlator scheme.

In a DSSS signal environment, if all signals are of almost the same power and processing gain, i.e. the length of the spreading codes, are also identical, statistical properties of interfering signals before dispreading are close to those of white Gaussian noise. That is, the eigen-values of the despread data correlation matrix will be almost identical such that the eigen-value spread is small. On the other hand, the eigen-value spread will increase as the signal powers are significantly diverse. Accordingly, the eigen-value spread can be used to detect the existence of strong jammers.

First Embodiment

Figure 1:
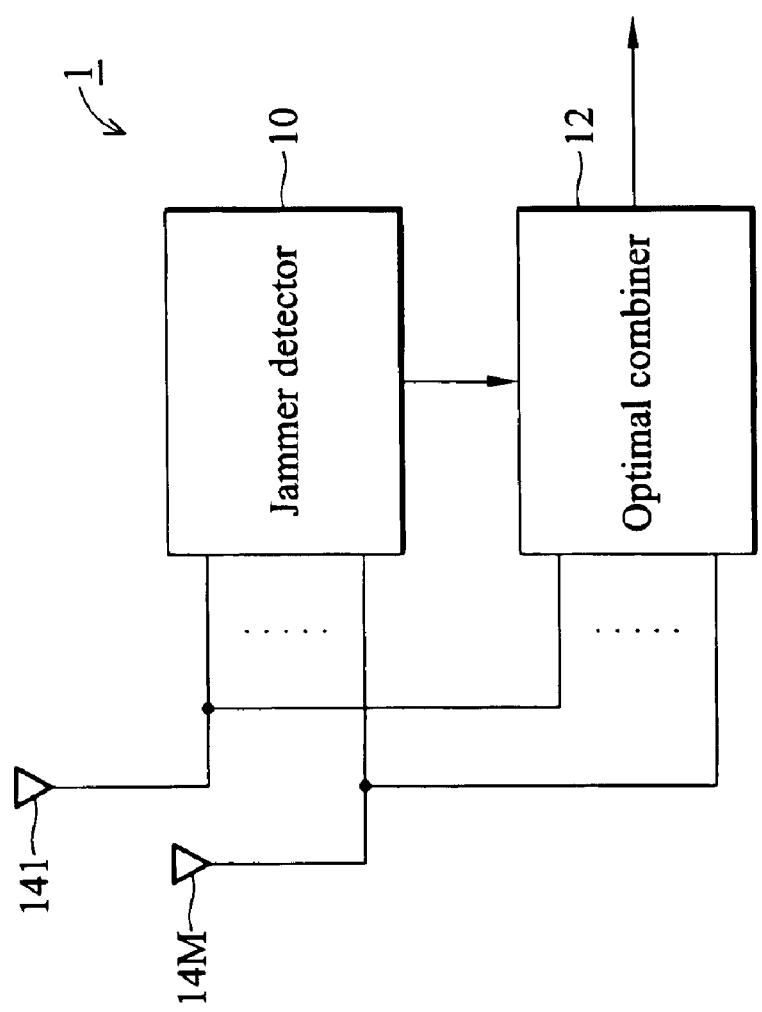
FIG. 1 is a schematic diagram illustrating the anti-jammer pre-processor according to the first embodiment of the present invention.

The present invention proposes a blind anti-jammer pre-processor 1 comprising a jammer detector 10 and an optimal combiner 12 as shown in FIG. 1.

The jammer detector 10 determines the strong jammers based on the eigen-value spread of the data correlation matrix associated with the received signals. According to the principle of eigen-values, the product of the eigen-value associated with the data correlation matrix R can be expressed by the determinant of R as shown in Equation (9).

$$\lambda_1 x \lambda_2 x \ldots x \lambda_M = \det(R) \qquad \text{Equation (9)}$$

where $\lambda_i$ for i=1, 2, ..., M denote the eigen-values, and det(.) denotes the determinant operator.

In the case of a system without strong jammers, the determinant of the data correlation matrix det (R) will be approximately equal to the product of M eigen-values as shown in Equation (10).

$$\det(R) \approx \sigma^{2M} \qquad \text{Equation (10)}$$

where $\sigma^2$ is the identical signal power (eigen-value), which is almost equal to the noise power of the received data correlation matrix. It is noteworthy that the identical signal power can be estimated by:

$$\sigma^2 \approx \sqrt[M]{\det(R)} \qquad \text{Equation (11)}$$

Furthermore, the sum of the eigen-values associated with the data correlation matrix R can be given by the sum of the diagonal elements of R, referred to as the trace of R.

$$\sum_{i=1}^{M} \lambda_i = \sum_{i=1}^{M} R_{ii} \equiv tr(R) \qquad \text{Equation (12)}$$

where $R_{ii}$ denotes the diagonal entries of the data correlation matrix R, and tr(.) denotes the trace operator representing the total power. According to Equation (12), it is easy to show that in the case of a system without strong jammers, the identical signal power can be determined by tr (R)/M. That is:

$$\lambda_1 \approx \sigma^2 \approx tr(R)/M \qquad \text{Equation (13)}$$

According to Equation (11) and (13), in a system without strong jammers, the value of $$\sqrt[M]{\det(R)}$$

is approximate to that of tr (R)/M, which yields to:

$$\gamma = \frac{tr(R)}{M \sqrt[M]{\det(R)}} \approx 1 \qquad \text{Equation (14)}$$

Consequently, the result of Equation (14) can be used to detect the existence of strong jammers. In the presence of strong jammers, the value of $\gamma$ will be significantly greater than 1. On the contrary, the jammer detector determines that a strong jammer is absence if the calculated result approaches 1 ($\gamma \approx 1$).

The overall procedure of the jammer detector can be summarized by the steps described below with the aid of the schematic diagram shown in FIG. 2.

First, the received data correlation matrix is computed according to Equation (4), $$\hat{R} = \frac{1}{N} \sum_{n=1}^{N} x[n] x^H [n].$$

Figure 2:
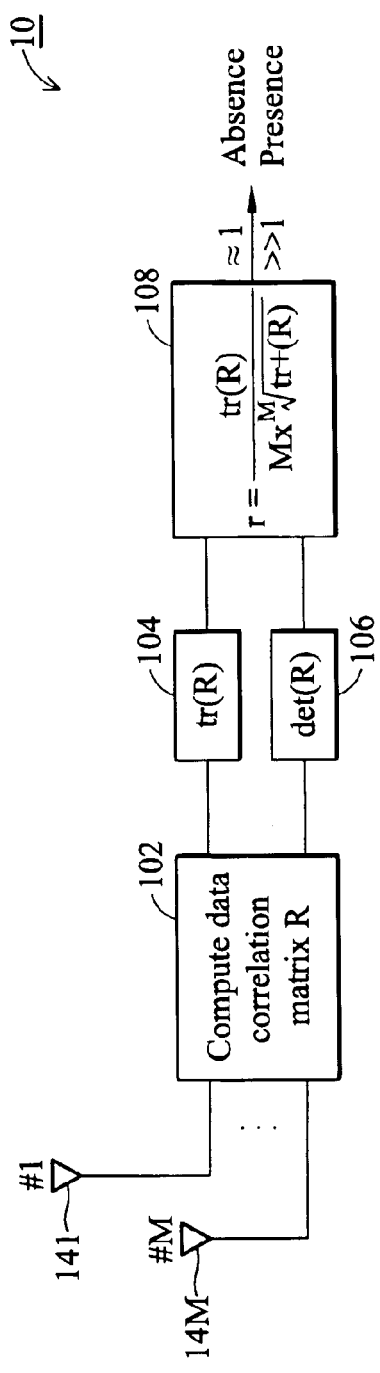
FIG. 2 is a schematic diagram of the jammer detector shown in FIG. 1 according to the present invention.

FIG. 2 also shows that Block 102 computes data correlation matrix R for the signal received from the antennas 141~14M.

The product and sum of the eigen-values are computed according to Equation (9) $\lambda_1 \times \lambda_2 \times \ldots \times \lambda_M = \det(R)$, and Equation (12)

$$\sum_{i=1}^{M} \lambda_i = \sum_{i=1}^{M} R_{ii} \equiv tr(R),$$

respectively, and as a result, the corresponding det (R) 104 and tr (R) 106 are obtained.

Next, the ratio $\gamma$ shown in Equation (14) is calculated in Block 108. The jammer detector determines that strong jammers exist if the value of $\gamma$ is much greater than 1, otherwise, only weak jammers of almost the same power with respect to the SOI exist.

With the jammers detected, the next step transforms the received data to remove the strong jammers. In accordance with the eigen-decomposition technique, the ensemble data correlation matrix R can be expressed as:

$$R \approx U_s \Lambda_s U_s^H + U_j \Lambda_j U_j^H \qquad \text{Equation (15)}$$

where $U_s$ and $U_j$ denote the signal subspace and the jammer subspace, respectively, associated with the eigen-values contributed by the SOI and the strong jammers. The diagonal matrices $\Lambda_s$ and $\Lambda_j$ are formed by the eigen-values driven by the SOI and the strong jammers, respectively. It is noteworthy that the approximation in Equation (15) holds due to the strong jammer assumption. From the fact that power of the strong jammers is well above that of the SOI, these dominant eigenvectors in $U_j$ form a subspace for the strong jammers. Alternatively, the other eigenvectors in $U_s$ span the complementary subspace which is approximately orthogonal to the effective steering vectors of the strong jammers. Hence the general solution of transformation T for suppressing the strong jammers is suggested by the complementary projection matrix associated with the jammer orthonormal matrix $U_j$:

$$T = I - U_j U_j^H \qquad \text{Equation (16)}$$

Once the jammer detector 10 in FIG. 1 determines whether there strong jammers exist in the signals received by the antennas 141~14M, it passes the information to the optimal combiner 12. The optimal combiner computes the weight vector w according to the presence/absence of the strong jammers.

If the jammer detector 10 detects strong jammers, the weight vector is constructed based on the transformed data Tx in order to ensure effective suppression of strong jammers. In the present embodiment, the weight vector is chosen in accordance with the maximum signal-plus-noise-to-noise ratio (MSNNR) criterion as shown in Equation (17).

$$\max_w \frac{E\{|w^H Tx|^2\}}{E\{|w^H Tn|^2\}} \equiv \frac{w^H TRTw}{w^H T^2 w} = \frac{w^H TRTw}{w^H Tw} \qquad \text{Equation (17)}$$

whose solution is given by the dominate mode (eigenvector associated with maximum eigen-value) of the eigen-equation:

$$TRTw = \eta Tw \qquad \text{Equation (18)}$$

where $\eta$ denotes the largest eigen-value of the eigen equation in Equation (18). Note that the fact that $T^2=T$ holds since T is an idempotent matrix. Since the strong jammers have been suppressed, the beam pattern obtained by the weight vector w can simultaneously form a main-beam for collecting SOI and nulls for suppressing the strong jammers.

The weight vector can be obtained based on the received data when strong jammers are absent. Similarly, the MSNNR criterion can be used again:

$$\max_w \frac{E\{|w^H x|^2\}}{E\{|w^H n|^2\}} \equiv \frac{w^H R w}{w^H w} \qquad \text{Equation (19)}$$

whose solution is given by $Rw = \eta w$, where $\eta$ denotes the largest eigen-value. Obviously, the beam pattern obtained by the weight vector w can form a main-beam to collect the SOI.

Second Embodiment

Figure 3:
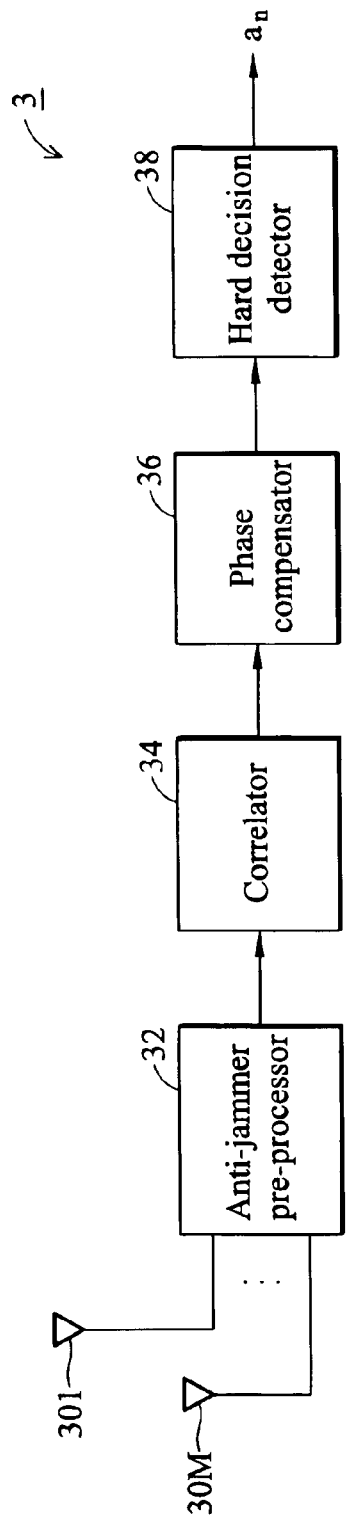
FIG. 3 is a block diagram of the GPS receiver according to the second embodiment of the present invention.

FIG. 3 is a block diagram showing the structure of the GPS receiver 3 according to the second embodiment of the present invention. The GPS receiver 3 mainly comprises an anti-jammer pre-processor 32, a correlator 34, a phase compensator, and a hard decision detector 38. The anti-jammer pre-processor 32 in FIG. 3 may be identical to the blind anti-jammer pre-processor described in the first embodiment. The outputs of the anti-jammer pre-processor 32 are despread by a correlator 34 to extract the transmitted data. A phase compensator 36 is required as the optimal combining performed on the SOI in the anti-jammer pre-processor 32 will introduce phase rotation. The phase rotation will induce significant degradation in performance if the phase is not properly corrected. As a remedy, a phase compensator is developed based on the predetermined 8-bit preambles in the first word (telemetry, TLM) associated with each subframe of GPS data to estimate the phase rotation introduced by the combining scheme. The corresponding data format of telemetry (TLM) word is shown in FIG. 4, wherein each word consists of 30 bits of data.

Specifically, the phase difference among the preamble bits (0,1), hidden in the received data, can be aligned by multiplying the despread data together with the predetermined preamble bits. Since the product of the despread data and the preamble bits will eliminate the effect of phases associated with the preamble bits, the phase-aligned data can be simultaneously processed during many bits. The estimated phase can be obtained by the following Equation.

$$\hat{\phi} = \arg\left(\frac{\sum_{n=1}^{8} \hat{a}_n a_n}{8}\right) \quad \text{Equation (20)}$$

Figures 4, 5:
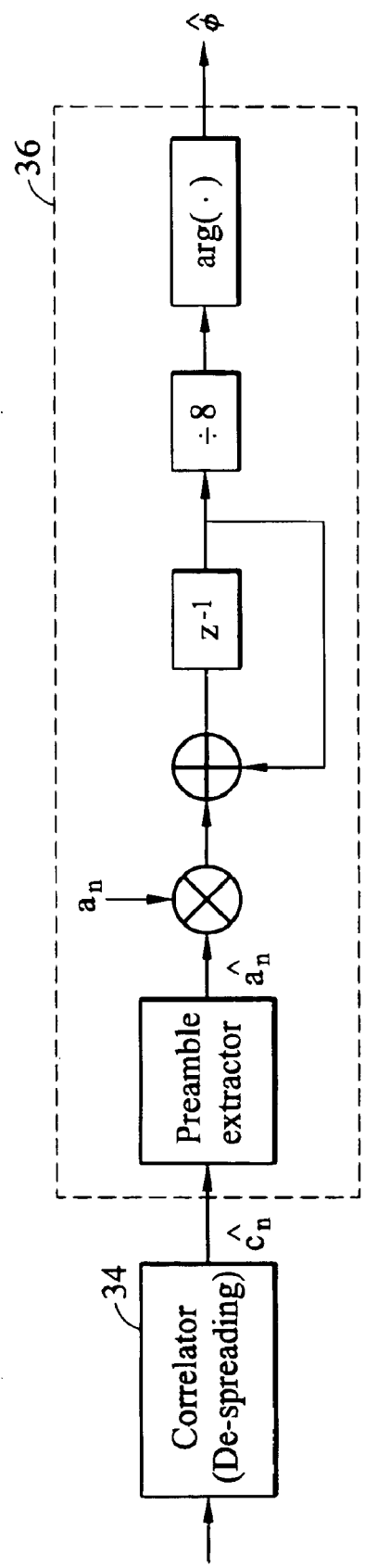
FIG. 4 illustrates the data format of the Telemetry (TLM) word used in the GPS system.
FIG. 5 is a schematic diagram of the phase compensator shown in FIG. 3 according to the present invention.

The corresponding schematic diagram is given by FIG. 5. Note that the multiplier for phase alignment is swapped with preamble extractor for ease in implementation. In FIG. 5, the phase compensator is composed of a preamble bit extractor used to locate the preamble bits, a phase aligning multiplier for compensating the phase among the preamble bits, and an accumulator for summing up the successive processed preamble bits.

The output of the phase compensator 36 in FIG. 3 is fed to the hard decision detector 38 to recover the GPS data bits.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An anti-jammer pre-processor for alleviating performance degradation due to strong jammers, comprising:

a jammer detector, configured to compute a data correlation matrix R associated with received data and determine whether the strong jammers exist according to an eigen-value spread of the data correlation matrix; and an optimal combiner, configured to construct a weight vector based on transformed data Tx if the strong jammers are detected by the jammer detector, else construct the weight vector based on the received data x;

wherein the weight vector controls a beam pattern for collecting a signal of interest (SOI).

2. The anti-jammer pre-processor according to claim 1, wherein the data correlation matrix R is approximated by a time-averaging operator, $$\hat{R} = \frac{1}{N} \sum_{n=1}^{N} x[n] x^H[n],$$

where x[n] denotes the nth sample of the received data and N denotes the number of samples.

3. The anti-jammer pre-processor according to claim 1, wherein the eigen-value spread is determined by computing a ratio between an averaged trace and a root of determinate of the data correlation matrix R, $$\frac{M \sqrt[M]{\det(R)}}{tr(R)},$$

wherein M denotes the number of eigen-values.

4. The anti-jammer pre-processor according to claim 3, wherein the trace is computed by summing diagonal elements of the data correlation matrix R.

5. The anti-jammer pre-processor according to claim 3, wherein the jammer detector determines that strong jammers exist in the received data if the ratio is greater than a preset value.

6. The anti-jammer pre-processor according to claim 5, wherein the preset value is 10.

7. The anti-jammer pre-processor according to claim 1, wherein the transformation T for deriving the transformed data Tx is a complementary projection matrix associated with a jammer orthonormal matrix $U_j$ (T=1−$U_j U_j^H$).

8. A Global Positioning System (GPS) receiver, comprising:

M antennas, receiving signals and outputting weighted and summed data according to a weight vector, wherein the weight vector controls a beam pattern for collecting a signal of interest (SOI);

an anti-jammer pre-processor, coupled to the antennas to detect if strong jammers exist in the received data, and suppressing the strong jammers by constructing the weight vector;

a correlator, despreading the output of the anti-jammer pre-processor to extract transmitted data; and a phase compensator, coupled to the correlator for detecting and offsetting phase rotation.

9. The GPS receiver according to claim 8, further comprising a hard decision detector coupled to the phase compensator to recover the GPS data bits.

10. The GPS receiver according to claim 8, wherein the anti-jammer pre-processor comprises:

a jammer detector, configured to compute a data correlation matrix R associated with the received data and determine whether the strong jammers exist according to an eigen-value spread of the data correlation matrix; and an optimal combiner, configured to construct the weight vector based on transformed data Tx if strong jammers are detected by the jammer detector, else construct the weight vector based on the received data x.

11. The GPS receiver according to claim 10, wherein the data correlation matrix R is approximated by a time-averaging operator, $$\hat{R} = \frac{1}{N}\sum_{n=1}^{N} x[n]x^H[n],$$

where x[n] denotes the nth sample of the received data and N denotes the number of samples.

12. The GPS receiver according to claim 10, wherein the eigen-value spread is determined by computing a ratio between an averaged trace and a root of determinate of the data correlation matrix R, $$\frac{M\sqrt[M]{\det(R)}}{tr(R)},$$

wherein M denotes the number of eigen-values.

13. The GPS receiver according to claim 12, wherein the trace is computed by summing diagonal elements of the data correlation matrix R.

14. The GPS receiver according to claim 12, wherein the jammer detector determines that strong jammers exist in the received data if the ratio is greater than a preset value.

15. The GPS receiver according to claim 14, wherein the preset value is 10.

16. The GPS receiver according to claim 10, wherein the transformation T for deriving the transformed data Tx is a complementary projection matrix associated with a jammer orthonormal matrix $U_j$ ($T=I-U_j U_j^H$).

17. The GPS receiver according to claim 8, wherein the phase compensator detects the phase rotation introduced by the anti-jammer pre-processor based on predetermined preambles in the first word associated with each subframe of GPS data.

18. The GPS receiver according to claim 17, wherein the phase compensator comprises:

a preamble extractor, locating the preambles;

a phase aligning multiplier, compensating the phases among the preamble bits by multiplying the despread data with the predetermined preambles; and an accumulator, summing up the successive processed preambles.

* * * * *